(12) United States Patent  
Hoffman et al.

(10) Patent No.: US 12,387,389 B1  
(45) Date of Patent: Aug. 12, 2025

(54) SYSTEMS AND METHODS FOR SIMULATING MULTIPLE LENSES

(71) Applicant: GoPro, Inc., San Mateo, CA (US)

(72) Inventors: Robert George Hoffman, Fremont, CA (US); Abraham Kislevitz, Carlsbad, CA (US); Alexander James Cashman, Pacifica, CA (US); Vincent Riaute, Carrieres sous Poissy (FR); Alexis Lefebvre, Paris (FR); Renaud Cousin, Verneuil sur Seine (FR); Alexandre Aubry, Champigny-sur-Marne (FR); Jean-Baptiste Noel, Le Vesinet (FR); Paul Charmoille, San Mateo, CA (US); Brice Gilbert, Paris (FR); Thomas Achddou, Paris (FR)

(73) Assignee: GoPro, Inc., San Mateo, CA (US)

( * ) Notice: Subject to any disclaimer, the term of this patent is extended or adjusted under 35 U.S.C. 154(b) by 357 days.

(21) Appl. No.: 18/187,942

(22) Filed: Mar. 22, 2023

Related U.S. Application Data

(60) Provisional application No. 63/406,141, filed on Sep. 13, 2022.

(51) Int. Cl.
*G06T 3/00* (2024.01)
*G06T 11/00* (2006.01)
*H04N 5/262* (2006.01)

(52) U.S. Cl.
CPC .......... *G06T 11/00* (2013.01); *H04N 5/2628* (2013.01); *G06T 2200/24* (2013.01)

(58) Field of Classification Search
CPC ................. G06T 11/00; G06T 2200/24; G06T 2207/20132; G06T 3/18; G06T 3/047; G06T 3/00; H04N 5/2628; H04N 23/698; B60R 1/28; B60W 2420/403
See application file for complete search history.

(56) References Cited

U.S. PATENT DOCUMENTS

| 10,402,938 | B1* | 9/2019 | Newman | H04N 5/2624 |
| 2016/0343107 | A1* | 11/2016 | Newman | G06T 3/00 |
| 2022/0092317 | A1* | 3/2022 | Yang | B60W 60/001 |
| 2023/0093497 | A1* | 3/2023 | Ye | G02B 13/0045 |
| | | | | 359/715 |

\* cited by examiner

*Primary Examiner* — Iriana Cruz
(74) *Attorney, Agent, or Firm* — Esplin & Associates, PC (57) ABSTRACT

Visual content of image(s)/video frame(s) may be captured through a lens of an image capture device. The optical characteristics of the lens may determine the field of view of the visual content and the distortion present within the visual content. Multiple selectable lenses may be provided to a user to modify the visual content. Multiple selectable lenses may include distortion consistency and field of view consistency between various selectable lenses. The visual content may be modified based on the selected lens to simulate capture of the visual content through the selected lens.

20 Claims, 8 Drawing Sheets

SYSTEMS AND METHODS FOR SIMULATING MULTIPLE LENSES

FIELD

This disclosure relates to simulating multiple lenses within visual content captured by an image capture device.

BACKGROUND

An image capture device may capture visual content of images/video frames using a particular lens. The lens used to capture the visual content may determine the distortion and the field of view depicted within the visual content. A user may wish to change the distortion and/or the field of view depicted within the visual content.

SUMMARY

This disclosure relates to simulating multiple lenses. Visual information and/or other information may be obtained. The visual information may define visual content having a source distortion and a source field of view. Selection of a lens from multiple selectable lenses may be obtained. Individual selectable lenses may be characterized by a distortion level and a field of view level. The multiple selectable lenses may include two dimensions of consistency between various selectable lenses. The two-dimensions of consistency may include distortion consistency between a first set of selectable lenses and field of view consistency between a second set of selectable lenses. The distortion consistency between the first set of selectable lenses may include the first set of selectable lenses being characterized by a single distortion level. The field of view consistency between the second set of selectable lenses may include the second set of selectable lenses being characterized by a single field of view level. Modified visual content may be generated based on the selected lens and/or other information. The modified visual content may include the visual content modified to have the distortion level and the field of view level of the selected lens.

A system for simulating multiple lenses may include one or more electronic storages, one or more processors, and/or other components. An electronic storage may store visual information, information relating to visual content, information relating to distortion, information relating to field of view, information relating to selectable lenses, information relating to selected lens, information relating to modification of visual content based on selected lens, and/or other information. In some implementations, the system may include one or more optical elements, one or more image sensors, and/or other components.

One or more components of the system may be carried by a housing, such as a housing of an image capture device. For example, the optical element(s) and/or the image sensor(s) of the system may be carried by the housing of an image capture device. The housing may carry other components, such as the processor(s) and/or the electronic storage. In some implementations, modified visual content may be generated by the image capture device based on selected lens and/or other information.

The processor(s) may be configured by machine-readable instructions. Executing the machine-readable instructions may cause the processor(s) to facilitate simulating multiple lenses. The machine-readable instructions may include one or more computer program components. The computer program components may include one or more of a visual information component, a lens selection component, a modification component, and/or other computer program components.

The visual information component may be configured to obtain visual information and/or other information. The visual information may define visual content. The visual content may have a source distortion and a source field of view.

The lens selection component may be configured to obtain selection of a lens from multiple selectable lenses. Individual selectable lenses may be characterized by a distortion level and a field of view level. The multiple selectable lenses may include two dimensions of consistency between various selectable lenses. The two-dimensions of consistency may include distortion consistency between a first set of selectable lenses and field of view consistency between a second set of selectable lenses. The distortion consistency between the first set of selectable lenses may include the first set of selectable lenses being characterized by a single distortion level. The field of view consistency between the second set of selectable lenses may include the second set of selectable lenses being characterized by a single field of view level.

In some implementations, the multiple selectable lenses for the visual content may be identified based on the source field of view of the visual content and/or other information.

In some implementations, the multiple selectable lenses include a first lens, a second lens, and/or other lens. The first lens and the second lens may have the field of view consistency and may not have the distortion consistency. The field of view consistency and non-distortion consistency between the first lens and the second lens may result in the first lens and the second lens providing same field of view of the visual content while using different aspect ratios.

In some implementations, the first lens may provide a 16:9 aspect ratio view of the visual content and the second lens may provide an 8:7 aspect ratio view of the visual content. Distortion of the visual content may be greater in the 16:9 aspect ratio view of the visual content provided by the first lens than in the 8:7 aspect ratio view of the visual content provided by the second lens. In some implementations, the 16:9 aspect ratio view of the visual content provided by the first lens may maintain shape of one or more things depicted within a center column of the visual content. In some implementations, the 8:7 aspect ratio view of the visual content provided by the second lens may include a radially symmetric distortion.

In some implementations, the multiple selectable lenses may further include a third lens and a fourth lens. The second lens may have the distortion consistency with the third lens and the fourth lens. The second lens, the third lens, and the fourth lens may not have the field of view consistency. In some implementations, the third lens may provide a 4:3 aspect ratio view of the visual content and the fourth lens may provide a 16:9 aspect ratio view of the visual content. Distortion of the visual content may be same in the 8:7 aspect ratio view of the visual content provided by the second lens, the 4:3 aspect ratio view of the visual content provided by the third lens, and the 16:9 aspect ratio view of the visual content provided by the fourth lens.

In some implementations, the multiple selectable lenses may further include a fifth lens. The third lens may not have the distortion consistency with the fifth lens. The third lens and the fifth lens may have the field of view consistency. The fifth lens may provide a 16:9 aspect ratio view of the visual content. Distortion of the visual content may be greater in the 16:9 aspect ratio view of the visual content provided by the fifth lens than in the 4:3 aspect ratio view of the visual content provided by the third lens. Distortion of the visual content may be less in the 16:9 aspect ratio view of the visual content provided by the fifth lens than in the 16:9 aspect ratio view of the visual content provided by the first lens.

The modification component may be configured to generate modified visual content based on the selected lens and/or other information. The modified visual content may include the visual content modified to have the distortion level and the field of view level of the selected lens.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
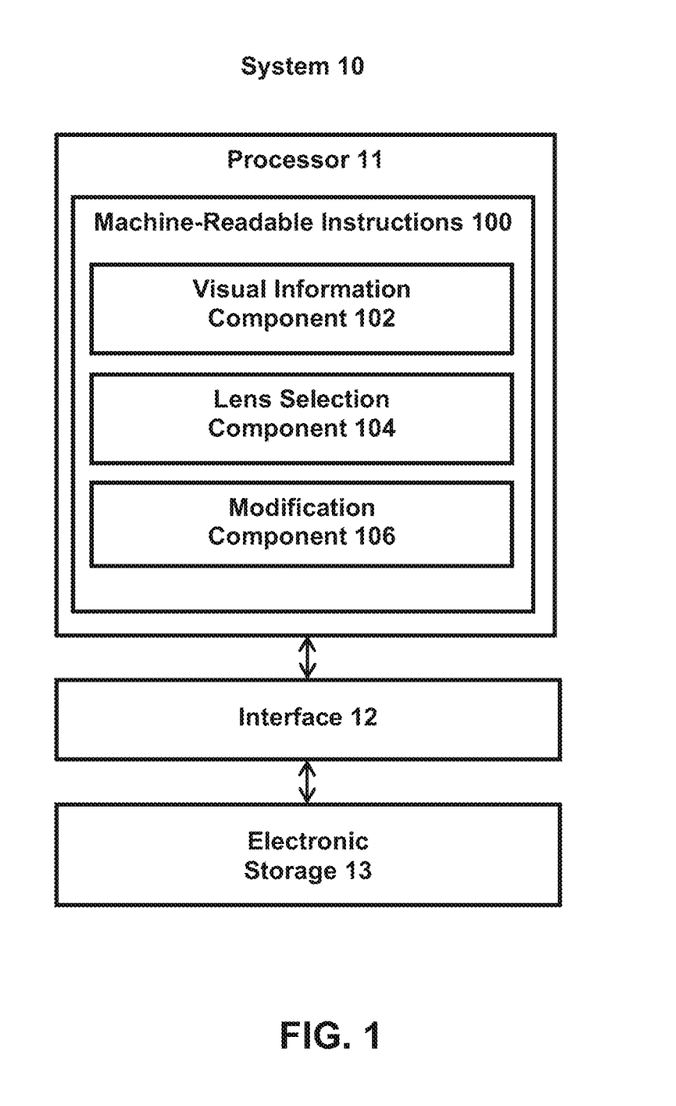
FIG. 1 illustrates an example system for simulating multiple lenses.

FIG. 1 illustrates a system 10 for simulating multiple lenses. The system 10 may include one or more of a processor 11, an interface 12 (e.g., bus, wireless interface), an electronic storage 13, and/or other components. In some implementations, the system 10 may include one or more optical elements, one or more image sensors, and/or other components. Visual information and/or other information may be obtained by the processor 11. The visual information may define visual content having a source distortion and a source field of view. Selection of a lens from multiple selectable lenses may be obtained by the processor 11. Individual selectable lenses may be characterized by a distortion level and a field of view level. The multiple selectable lenses may include two dimensions of consistency between various selectable lenses. The two-dimensions of consistency may include distortion consistency between a first set of selectable lenses and field of view consistency between a second set of selectable lenses. The distortion consistency between the first set of selectable lenses may include the first set of selectable lenses being characterized by a single distortion level. The field of view consistency between the second set of selectable lenses may include the second set of selectable lenses being characterized by a single field of view level. Modified visual content may be generated by the processor 11 based on the selected lens and/or other information. The modified visual content may include the visual content modified to have the distortion level and the field of view level of the selected lens.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to distortion, information relating to field of view, information relating to selectable lenses, information relating to selected lens, information relating to modification of visual content based on selected lens, and/or other information.

Visual content may refer to content of image(s) (e.g., single image, burst images, video frame(s), and/or video(s)) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of the video at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device. An image capture device may refer to a device that captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

A field of view of visual content may define a field of view of a scene captured within the visual content. A field of view of visual content may refer to an extent of a scene captured and/or viewable within the visual content. A field of view of visual content may refer to a part of a scene from which light is received for generation of the visual content. The field of view captured within the visual content may depend on optical characteristics (e.g., geometry, material) of the lens(es) through which the visual content is captured. A lens may refer to an optical element (e.g., glass, transparent substance) that acts upon light passing through the lens. A lens may affect direction, deviation, and/or path of the light passing through the lens.

Visual content may be captured with distortion. A distortion may refer to deviation from rectilinear projection. In rectilinear projection, a straight line within a scene may be depicted as a straight line in the visual content. A distortion may cause deviation of the visual content from rectilinear projection such that a straight line within a scene is depicted within the visual content as a non-straight line (e.g., curved line). The distortion within the visual content may depend on optical characteristics of the lens(es) through which the visual content is captured.

The system 10 may be remote from the image capture device that captured the visual content or local to the image capture device that captured the visual content. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s) and/or image sensor(s) of the system 10 may be carried by the housing of the image capture device. The housing may carry other components, such as the processor 11 and/or the electronic storage 13.

Visual content may be captured through one or more lenses. The lens(es) may control how light is passed onto the image sensor(s) of the image capture device for visual content capture. The lens(es) may determine how much of the scene (field of view) is captured within the visual content and any distortion of the scene in the visual content. The original field of view that is captured through the lens(es) may be referred to as a source field of view. The original distortion that is caused by the lens(es) may be referred to as source distortion.

A user may wish to view the visual content with different distortion and/or different field of view. For example, a wide field of view visual content may have been captured with a fisheye distortion, and a user may wish to view a smaller part of the visual content with a different/no distortion. A user may wish to view the visual content with different aspect ratio. For example, a wide field of view visual content with fisheye distortion may have been captured in 4:3 aspect ratio, and a user may wish to view the visual content in 16:9 aspect ratio.

The present disclosure enables changes in distortion and field of view of visual content captured by an image capture device. The distortion and field of view of the visual content may be changed to simulate the visual content being captured through different lenses. The distortion and field of view of the visual content may be changed to change the aspect ratio of the visual content.

Figure 3:
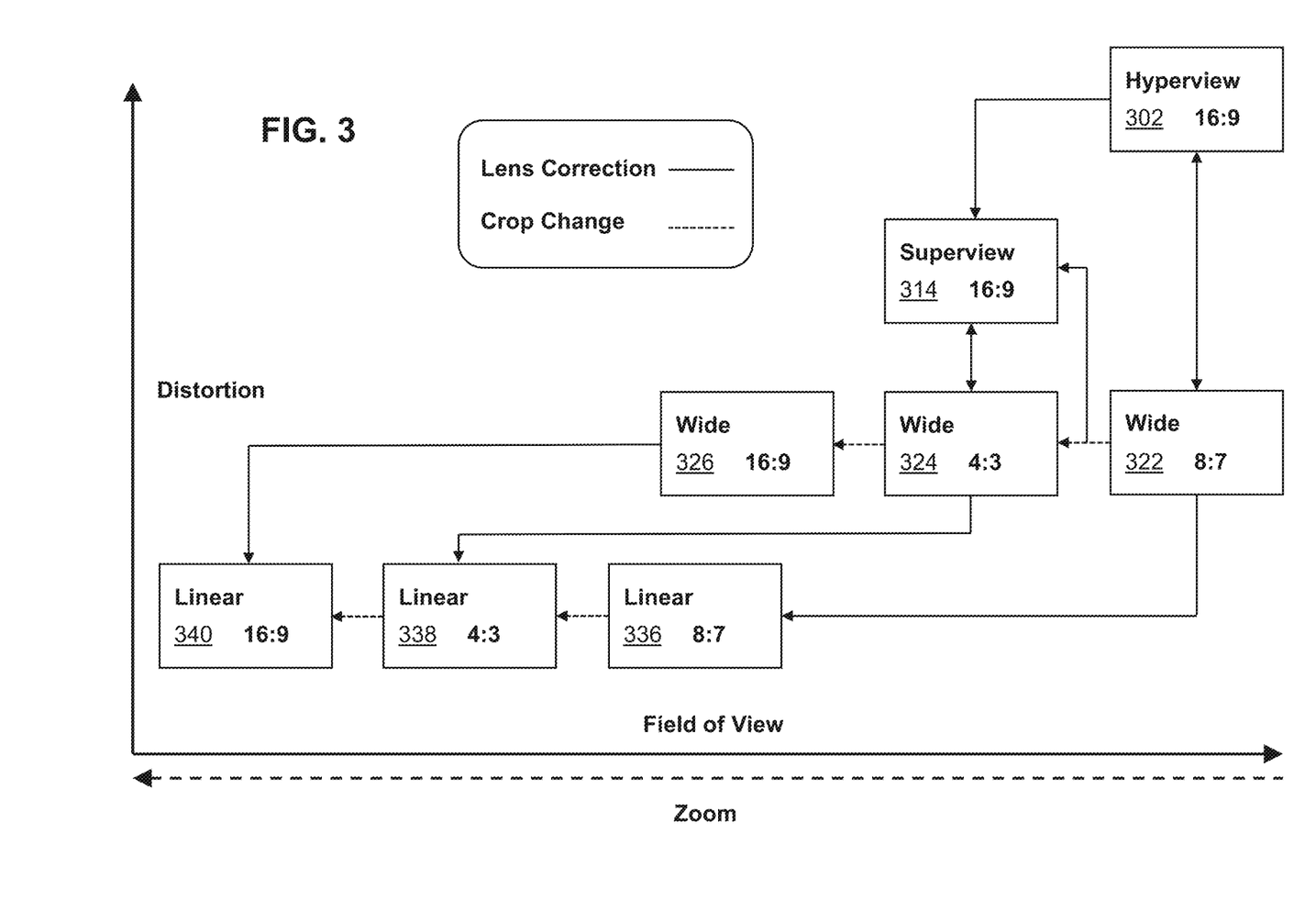
FIG. 3 illustrates example distortions and fields of view of multiple lenses.

FIG. 3 illustrates example distortions and fields of view of multiple lenses 302, 314, 322, 324, 326, 336, 338, 340. Visual content may be captured through a particular lens. Visual content may be modified to simulate the visual content being captured through different lenses shown in FIG. 3. Changes in lenses may cause changes in distortion and/or field of view of the visual content. The specific lenses 302, 314, 322, 324, 326, 336, 338, 340 shown in FIG. 3 are merely provided as examples. Other types of lenses (with other distortion and/or field of view) are contemplated. Example names of lenses (e.g., Hyperview, Superview, Wide, Linear) are shown in FIG. 3. Other names of lenses are contemplated. Example aspect ratio of lenses (e.g., 16:9, 4:3, 8:7) of lenses are shown in FIG. 3. Other aspect ratios of lenses are contemplated.

In FIG. 3, the lenses 302, 314, 322, 324, 326, 336, 338, 340 may be arranged using field of view and distortion. From left to right, the lenses 302, 314, 322, 324, 326, 336, 338, 340 may be arranged based on increase in field of view. Using lenses to the left may result in visual content having smaller field of view (e.g., zoom in) while using lenses to the right may result in visual content having larger field of view (e.g., zoom out). From bottom to top, the lenses 302, 314, 322, 324, 326, 336, 338, 340 may be arranged based on increase in distortion. Using lower lenses may result in the visual content having smaller/no distortion, while using higher lenses may result in visual content having greater distortion (e.g., greater curvature of straight lines in the visual content). For example, use of the lens 302 may result in a view of the visual content with greatest distortion and largest field of view, while use of the lens 340 may result in a view of the visual content with least/no distortion and smallest field of view.

The lenses that are selectable to modify visual content may be designed to include two dimensions of consistency between various selectable lenses. The two dimensions of consistency may include distortion consistency and field of view consistency. Distortion consistency between different lenses may include the different lenses being characterized by a single distortion level. A distortion level may indicate the amount, quantity, and/or extent of distortion. Different lenses being characterized by a single distortion level may include the different lenses having the same distortion characteristics. Different lenses being characterized by a single distortion level may include the different lenses simulating capture of the visual content through the same type of lens (e.g., lens of same geometry, material). Different lenses being characterized by a single distortion level may include the different lenses causing the same type and/or amount of distortion within the visual content.

In FIG. 3, the lenses that have distortion consistency may include lens that are on the same row. For example, the lenses 322, 324, 326 may have distortion consistency. Use of the lenses 322, 324, 326 may cause the same type and/or amount of distortion within the visual content. For example, use of the lenses 322, 324, 326 may cause the same/same type of radially symmetric distortion within the visual content. Radially symmetric distortion may include symmetry of distortion around a central point. As another example, the lenses 336, 338, 340 may have distortion consistency. Use of the lenses 336, 338, 340 may cause the same type and/or amount of distortion within the visual content. For example, use of the lenses 336, 338, 340 may result in no distortion within the visual content such that straight lines within the scene are depicted as straight lines within the visual content.

Field of view consistency between different lenses may include the different lenses being characterized by a single field of view level. A field of view level may indicate the amount, quantity, and/or extent of the scene depicted within the visual content. Different lenses being characterized by a single field of view level may include the different lenses having the identical/nearly identical field of view characteristics. Different lenses being characterized by a single field of view level may include the different lenses simulating capture of identical/nearly identical amount of the scene within the visual content. Different lenses being characterized by a single field of view level may include the different lenses including identical/nearly identical amount of the scene within the visual content. Different views of the visual content having nearly identical amount of the scene may include differences in the fields of view being imperceptible. Different views of the visual content having nearly identical amount of the scene may include the differences in the field of view being located at the periphery/edges/corners of the visual content. Different views of the visual content having nearly identical amount of the scene may include the differences in the field of view being lower than a threshold amount (e.g., less than a threshold percentage of pixels in one view missing from the other view).

In FIG. 3, the lenses that have field of view consistency may include lens that are on the same column. For example, the lenses 302, 322 may have field of view consistency. Use of the lenses 302, 322 may cause identical/nearly identical amount of the scene to be depicted within the visual content. As another example, the lenses 314, 324 may have field of view consistency. Use of the lenses 314, 324 may cause identical/nearly identical amount of the scene to be depicted within the visual content.

The distortion of the lens 302 may enable the visual content captured using the lens 322 to change its aspect ratio (from 8:7 to 16:9) while retaining the field of view (e.g., retaining nearly all of the field of view). The distortion of the lens 314 may enable the visual content captured using the lens 324 to change its aspect ratio (from 4:3 to 16:9) while retaining the field of view (e.g., retaining all of the field of view).

The lenses 302, 314 may cause non-radially symmetric distortions within the visual content. The lenses 302, 314 may cause different non-radially symmetric distortions within the visual content.

The non-radially symmetric distortion of the lens 302 may preserve shape of depiction(s) within a center column of the visual content. Within the center column of the visual content, the shape of depiction(s) may not appear to be warped. Outside the center column, the shape of depiction(s) may appear to be warped, with the amount of warping increasing with greater distance from the center column. In some implementations, the center column of the visual content may extend from the top of the visual content to the bottom of the visual content. In some implementations, the center column of the visual content may extent from a top part/nearly the top of the visual content to a bottom part/nearly the bottom of the visual content.

The non-radially symmetric distortion of the lens 314 may preserve shape of depiction(s) within a center portion of the visual content. Within the center portion of the visual content, the shape of depiction(s) may not appear to be warped. Outside the center portion, the shape of depiction(s) may appear to be warped, with the amount of warping increasing with greater distance from the center portion.

Which of the lenses are available for selection (to modify visual content) may depend on the source field of view of the visual content. The amount of field of view that is originally captured within the visual content may determine which lenses are identified for potential selection by a user. The amount of field of view that is originally captured within the visual content may determine which lenses may be offered as a selection option to a user. For example, responsive to the visual content being captured by an image capture device using the lens 324, the lenses 314, 326, 336, 338, 340 may be available for selection by the user to modify the visual content. The lenses 302, 322 may not be available for selection by the user to modify the visual content because the fields of view of the lenses 302, 322 are greater than the field of view of the lens 324.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate simulating multiple lenses. The machine-readable instructions 100 may include one or more computer program components. The machine-readable instructions 100 may include one or more of a visual information component 102, a lens selection component 104, a modification component 106, and/or other computer program components.

The visual information component 102 may be configured to obtain visual information and/or other information. Obtaining visual information may include one or more of accessing, acquiring, analyzing, determining, examining, generating, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

In some implementations, the visual information component 102 may obtain visual information based on user interaction with a user interface/application (e.g., image/video editing application, image/video viewer application), and/or other information. For example, a user interface/application may provide option(s) for a user to select visual content to be viewed. The visual information defining the visual content may be obtained based on the user's selection of the visual content/image through the user interface/video application. Other selections of visual content/image for retrieval of visual information are contemplated.

The visual information may define visual content. The visual information may define visual content of one or more images/video frames. The visual information may define visual content captured by an image capture device. The visual content may be captured through one or more lenses of the image capture device. The visual content may have a source distortion and a source field of view. The source distortion may refer to the distortion of the visual content captured by the lens(es) of the image capture device. The source field of view may refer to the field of view that is captured through the lens(es) of the image capture device.

The lens selection component 104 may be configured to obtain selection of a lens from multiple selectable lenses. Obtaining selection of a lens may include one or more of accessing, acquiring, analyzing, determining, examining, identifying, loading, locating, opening, receiving, retrieving, reviewing, and/or otherwise obtaining the selection of the lens. The selection of the lens may be made by a user. The selection of the lens may be made by a user via user interaction with one or more user interface devices (e.g., touchscreen display, button, switch, mouse, keyboard). The selection of the lens may be made by a user via user interaction with one or more graphical user interfaces. For example, a graphical user interface may present options for a user to select among multiple selectable lenses, and the selection of the lens may be obtained based on user selection of a particular option corresponding to a particular lens.

In some implementations, multiple selectable lenses for the visual content may be identified based on the source field of view of the visual content and/or other information. The source field of view of the visual content may be used to determine which selectable lenses are available to modify the visual content. The selectable lens that are identified for the visual content may include lenses with fields of view that are same/nearly the same as or smaller than then source field of view. Lenses with fields of view larger than the source field of view may not be identified for the visual content. A user may not be presented with options to select lenses that require a larger field of view than the source field of view.

Individual selectable lenses may be characterized by a distortion level and a field of view level. A selectable lens being characterized by a distortion level may include the selectable lens simulating a specific amount and/or type of distortion within the visual content. A selectable lens being characterized by a field of view level may include the selectable lens simulating capture of visual content having a particular field of view. Different selectable lenses may be characterized by different distortions level and/or different field of view levels. Different selectable lenses may simulate different amount and/or type of distortion within the visual content and/or simulate capture of visual content having different field of view.

The multiple selectable lenses may be designed to include two dimensions of consistency between various selectable lenses. The two-dimensions of consistency may include distortion consistency between one or more sets of selectable lenses and field of view consistency between one or more sets of selectable lenses. Distortion consistency between a set of selectable lenses may include the set of selectable lenses being characterized by a single distortion level. For example, referring to FIG. 3, the lenses 322, 324, 326 may have distortion consistency and the lenses 336, 338, 340 may have distortion consistency. Field of view consistency between a set of selectable lenses may include the set of selectable lenses being characterized by a single field of view level. For, example referring to FIG. 3, the lenses 302, 322 may have field of view consistency and the lenses 314, 324 may have field of view consistency.

Various distortions and fields of view of the lenses may be used to provide different views of the visual content. For example, referring to FIG. 3, the lens 302 and the lens 322 may have field of view consistency, but may not have distortion consistency. Field of view consistency and non-distortion consistency between the lens 302 and the lens 322 may result in the lenses 302, 322 providing the same/nearly the same field of view of the visual content while using different aspect ratios. The lens 302 may be used to provide a 16:9 aspect ratio view of the visual content while the lens 322 may be used to provide an 8:7 aspect ratio view of the visual content.

To account for differences in aspect ratio while maintaining the field of view, the distortion of the visual content may be greater in the 16:9 aspect ratio view of the visual content provided by the lens 302 than in the 8:7 aspect ratio view of the visual content provided by the lens 322. In some implementations, the 16:9 aspect ratio view of the visual content provided by the lens 302 may maintain shape of one or more things depicted within a center column of the visual content. The center column of the visual content may extend from the top/near the top of the visual content to the bottom/near the bottom of the visual content. The amount of distortion may increase with greater distance from the center column. In some implementations, the 8:7 aspect ratio view of the visual content provided by the lens 322 may include a radially symmetric distortion. The 8:7 aspect ratio view of the visual content provided by the lens 322 may be changed to the 16:9 aspect ratio view of the visual content provided by the lens 302 by applying an anamorphic, non-linear warp to the 8:7 aspect ratio view. The anamorphic, non-linear warp may include vertical scaling and horizontal scaling of the visual content.

The changes (conversions) in lenses shown in FIG. 3 are provided as examples and are not meant to be limiting. In some implementations, changes to other lens(es) may be provided. Lens correction may be combined with crop change (change in crop size) from any of the boxes to achieve the desired distortion and field of view/aspect ratio within the modified visual content. For example, change from the lens 324 to the lens 336 may be provided. In some implementations, one or more changes shown in FIG. 3 may not be provided.

Figure 4A:
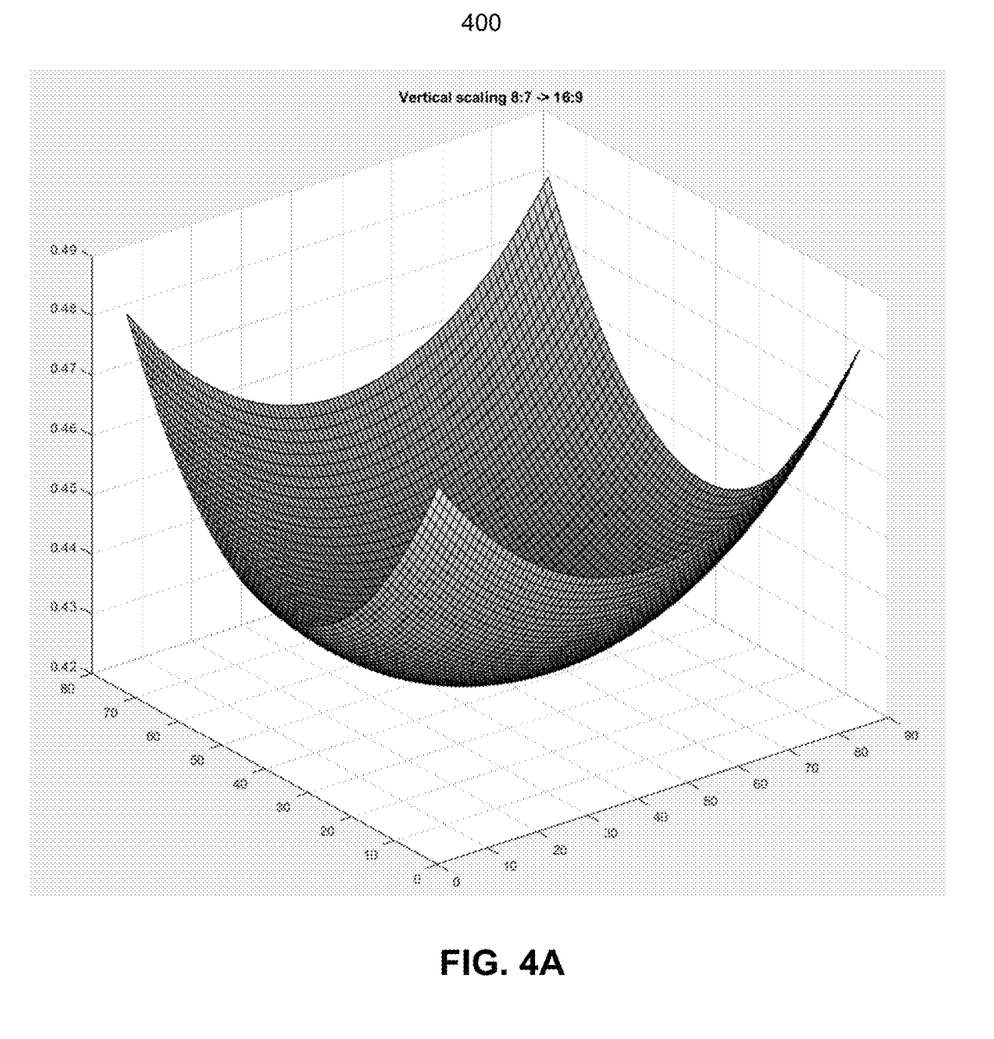
FIG. 4A illustrates an example vertical scaling for a lens.

FIG. 4A illustrates an example vertical scaling for a lens. The vertical scaling shown in FIG. 4A may be used in the anamorphic, non-linear warp to change the 8:7 aspect ratio view of the visual content provided by the lens 322 to the 16:9 aspect ratio view of the visual content provided by the lens 302. The vertical scaling may nonlinearly shrink the visual content, with the center of the visual content shrinking more than the edges/corners of the visual content. The values of vertical scaling may range from about 0.48 in the corners to about 0.43 in the center.

Figure 4B:
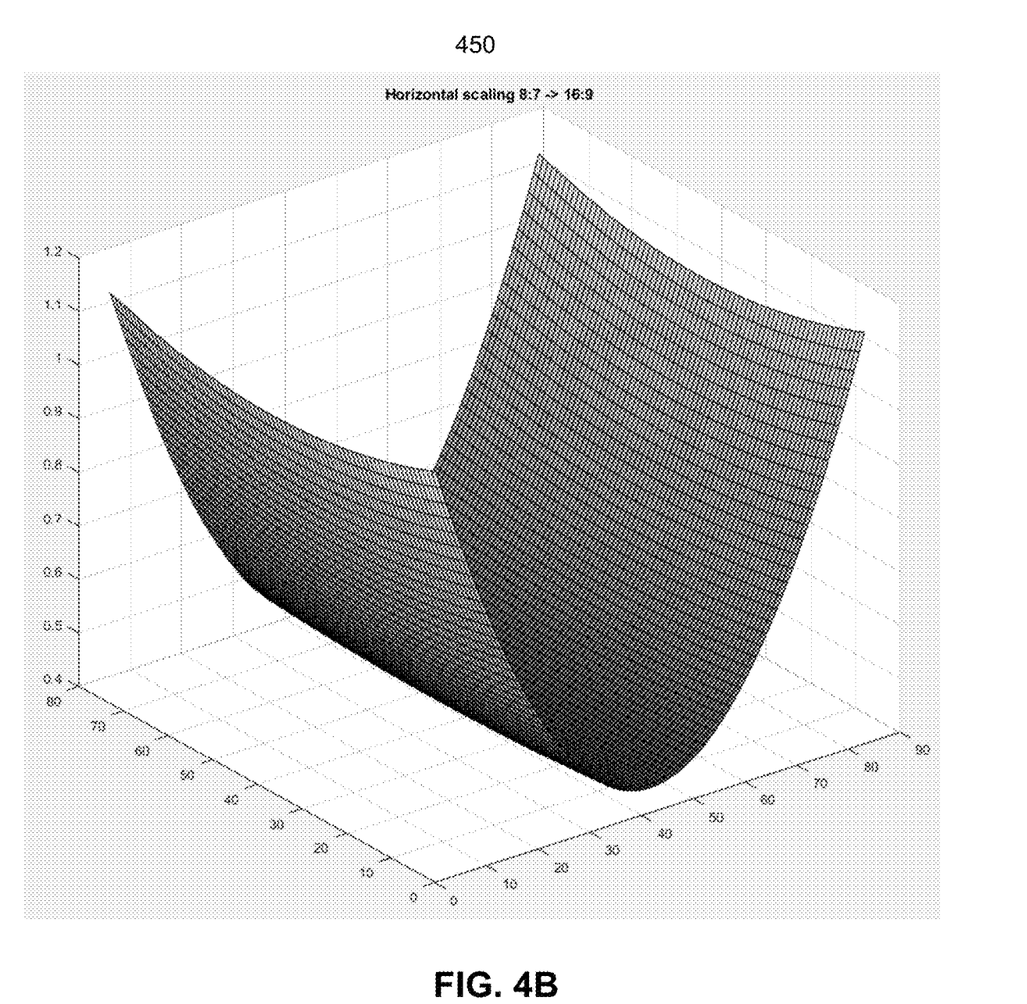
FIG. 4B illustrates an example horizontal scaling for a lens.

FIG. 4B illustrates an example horizontal scaling for a lens. The horizontal scaling shown in FIG. 4B may be used in the anamorphic, non-linear warp to change the 8:7 aspect ratio view of the visual content provided by the lens 322 to the 16:9 aspect ratio view of the visual content provided by the lens 302. The horizontal scaling may nonlinearly shrink or stretch the visual content, with the horizontal center of the visual content shrinking the most and the horizontal edges of the visual content being stretched the most. The values of horizontal scaling may range from about 0.4 in the center to about 1.2 at the edges.

Figure 5A:
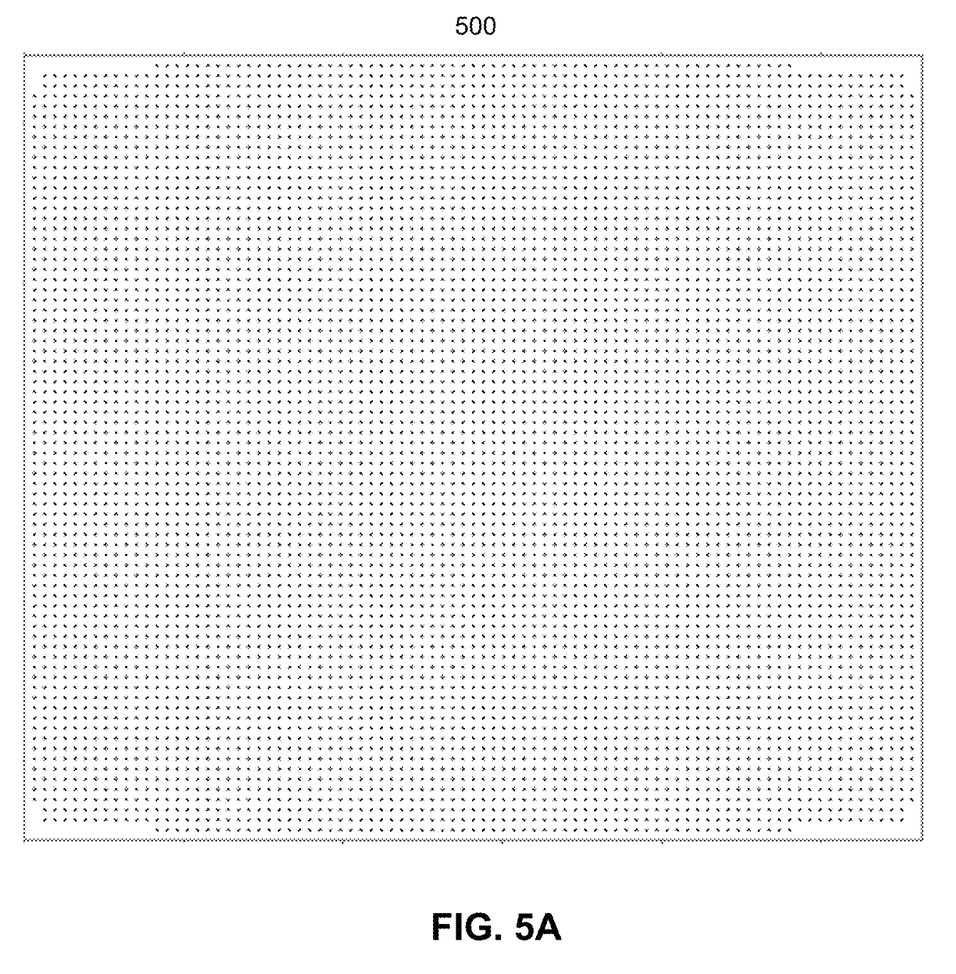
FIG. 5A illustrates an example input grid mapping for a lens.
Figure 5B:
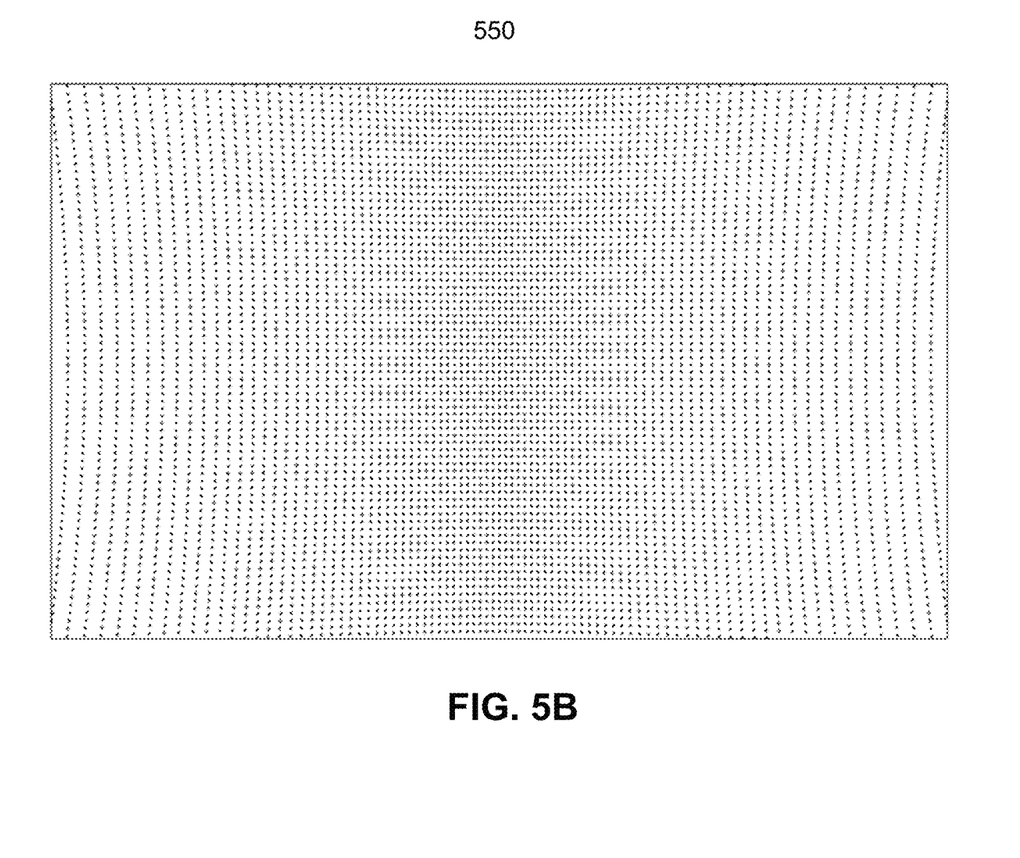
FIG. 5B illustrates an example output grid mapping for a lens.

FIG. 5A illustrates an example input grid mapping 500 and FIG. 5B illustrates an example output grid mapping 550 for a lens. The input grid mapping 500 and the output grid mapping 550 may illustrate the warp that is performed by the anamorphic, non-linear warp to change the 8:7 aspect ratio view of the visual content provided by the lens 322 to the 16:9 aspect ratio view of the visual content provided by the lens 302. For example, the warp may scale the vertical dimension by 0.642857x (shrink the visual content vertically), and anamorphic warp may be applied in the horizontal dimension to keep the center column in correct proportions while left and right sides are allowed to stretch by up to 3x. The number of points shown within the input grid mapping 500 and the output grid mapping 550 are merely provided as example. For example, smaller number of points may be used in the mapping to increase the speed of warping operation. While FIG. 5A shows the input grid mapping 500 with a regular grid and FIG. 5B shows the output grid mapping 500 with a non-regular grid, this is merely as an example and is not meant to be limiting. For example, the output grid mapping may include a regular grid and the input grid mapping may include a non-regular grid.

As shown in FIGS. 5A and 5B, the warp that is performed using the input grid mapping 500 and the output grid mapping 550 may preserve the shapes of things depicted within the center column of the visual content. Sizes of things depicted within the center column may be decreased (e.g., down scaled to 0.642857x). Shapes may be distorted outside the center column, with the amount of distortion increasing with distance from the center column (e.g., stretched by up to 3x). The warp may not preserve all pixels within the visual content. For example, corners of visual content may not be present in the modified visual content.

Figure 6:
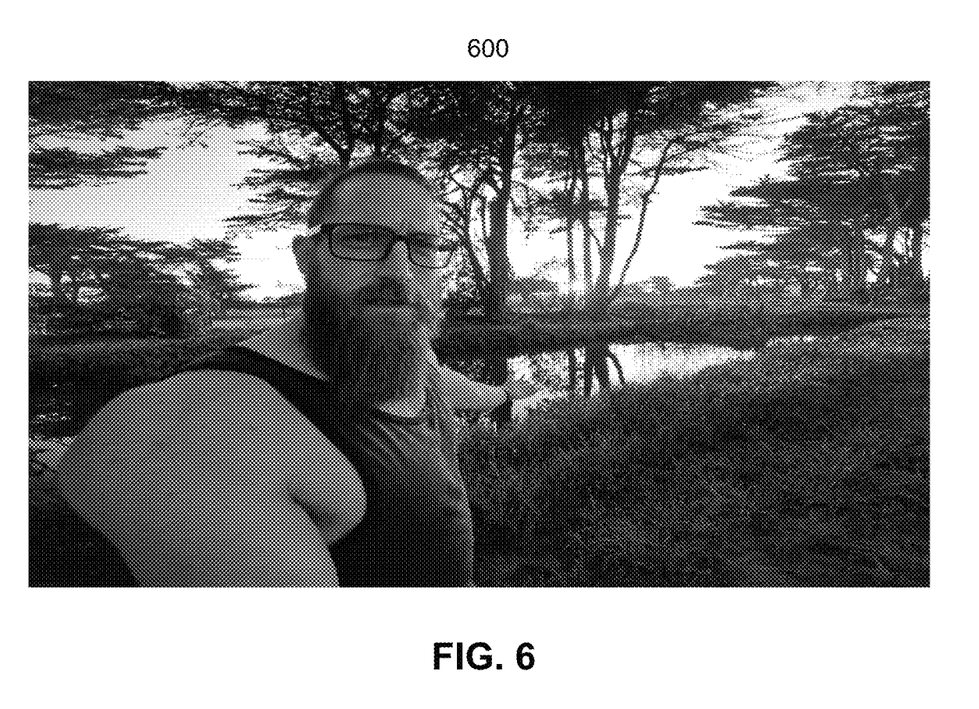
FIG. 6 illustrates an example modified image.

FIG. 6 illustrates an example modified image 600. The modified image 600 may be generated by applying an anamorphic, non-linear warp to change an 8:7 aspect ratio image to the 16:9 image shown in FIG. 6. Warp to change the 8:7 aspect ratio image to the 16:9 aspect ratio image may preserve the shapes while decreasing the sizes of things depicted within the center column of the image 600. The shapes of things may be distorted outside the center column of the image 600, with the amount of distortion increasing towards the left and right edges of the image 600.

Other types of views of visual content may be provided using different selectable lenses. Referring back to FIG. 3, the lenses 322, 324, 326 may have distortion consistency, but may not have field of view consistency. Distortion consistency and non-field of view consistency between the lenses 322, 324, 326 may result in the lenses 322, 324, 326 using the same amount/type of distortion for differently sized/dimensioned views of the visual content. For example, the lens 322 may provide an 8:7 aspect ratio view of the visual content, the lens 324 may provide a 4:3 aspect ratio view of the visual content, and the lens 326 may provide a 16:9 aspect ratio view of the visual content. Distortion of the visual content may be same in the 8:7 aspect ratio view of the visual content provided by the lens 322, the 4:3 aspect ratio view of the visual content provided by the lens 324, and the 16:9 aspect ratio view of the visual content provided by the lens 326. For example, the views provided by the lenses 322, 324, 326 may have same curvature of straight lines within a scene with different zooms. Similarly, the lenses 336, 338, 340 may have distortion consistency (e.g., no distortion), but may not have field of view consistency. For example, the lenses 336, 338, 340 may provide progressively more zoomed in views of the visual content without distortion.

The lenses 314, 324 may have field of view consistency, but may not have distortion consistency with the fifth lens. Field of view consistency and non-distortion consistency between the lens 314 and the lens 324 may result in the lenses 314, 324 providing the same field of view of the visual content while using different aspect ratios. The lens 314 may be used to provide a 16:9 aspect ratio view of the visual content while the lens 324 may be used to provide a 4:3 aspect ratio view of the visual content.

To account for differences in aspect ratio while maintaining the field of view, the distortion of the visual content may be greater in the 16:9 aspect ratio view of the visual content provided by the lens 314 than in the 4:3 aspect ratio view of the visual content provided by the lens 324. Distortion of the visual content may be less in the 16:9 aspect ratio view of the visual content provided by the lens 314 than in the 16:9 aspect ratio view of the visual content provided by the lens 302.

In some implementations, the 16:9 aspect ratio view of the visual content provided by the lens 314 may maintain shape of one or more things depicted within a center portion of the visual content. The amount of distortion may increase with greater distance from the center portion. The warp between the 16:9 aspect ratio view of the visual content provided by the lens 314 and the 4:3 aspect ratio view of the visual content provided by the lens 324 may preserve all pixels of the visual content. Warping of the 4:3 aspect ratio view of the visual content provided by the lens 324 into the 16:9 aspect ratio view of the visual content provided by the lens 314 may utilize all pixels of the 4:3 aspect ratio view of the visual content, and vice versa.

The modification component 106 may be configured to generate modified visual content based on the selected lens and/or other information. The modified visual content may include the visual content modified to have the distortion level and the field of view level of the selected lens. The modified visual content may be generated for viewing and/or storage. The modified visual content may be generated by changing the distortion within the visual content and/or the field of view of the visual content. The modified visual content may be generated to replace the visual content and/or as a different version of the visual content.

Changing the distortion within the visual content may include modifying the visual content to simulate capture of the modified visual content through the selected lens. Changing the distortion within the visual content may include warping the visual content. Warping of the visual content may refer to digital manipulation of the visual content. Warping of the visual content may refer to distortion of thing(s) depicted within the visual content. Warping of the visual content may refer to change in how the visual content depicts thing(s). For example, warping of the visual content may include stretching and/or squeezing of the visual content in one or more directions. Other types of warping of the visual content are contemplated.

Warping may directly change the visual content from having source distortion to the distortion of the selected lens. Warping may indirectly change the visual content from having source distortion to the distortion of the selected lens. For example, warping may be applied to remove the source distortion from the visual content and then another warping may be applied to add the distortion of the selected lens. For instance, information about the properties of the lens (e.g., lens characteristics, lens polynomials) through which the visual content is captured may be used to remove the source distortion and the distortion of the selected lens may be applied to the visual content. For example, an image capture device may have captured visual content using Superview (the lens 314) or Hyperview (the lens 302), which may result in the visual content having a particular field of view and a particular distortion. The source distortion within the visual content may be reversed using the one-variable polynomial for radial distortion and the two-variable, 2D polynomial (e.g., X and Y variables) for warp. Numerical inverse of the source distortion may be determined (e.g., computed on a GPU) for the visual content to reverse the source distortion. Numerical inversion of the source distortion may be computed for individual images (e.g., for a photo, for individual video frames of a video).

In some implementations, warping may be applied using mapping between pixels locations within the visual content and pixel locations within the modified visual content. For example, different mappings may be built to specify which pixel(s) of the visual content will be sampled to generate a pixel of the modified visual content for different changes in lens. For example, one mapping may be built to modify the visual content from using the lens 324 to the lens 314, and another mapping may be built to modify the visual content from using the lens 324 to the lens 302. Mapping corresponding to a specific change between different lenses may be used to generate the modified visual content.

In some implementations, warping may be applied using ray tracing. Ray tracing may backtrack light rays for individual pixels from the visual content to the image sensor space (removing distortion of the lens), and light rays from individual pixels of the image sensor space may be reprojected through the selected lens to apply the distortion of the selected lens.

In some implementations, modified visual content may be generated by the image capture device. For example, the image capture device may have captured the visual content, and the image capture device may simulate capture of the visual content through other lens(es) by generating the modified visual content using the selected lens(es). In some implementations, modified visual content may be generated by another computing device. The computing device may obtain the visual content captured by the image capture device and simulate capture of the visual content through other lens(es) by generating the modified visual content using the selected lens(es).

In some implementations, information on lens used for the visual content (e.g., lens through which the visual content is captured, lens that is simulated) may be associated with and/or stored with the visual information. For example, information on the lens used, such as distortion of the lens, the field of view of the lens, the aspect ratio for the lens, and/or other information on the lens may be stored within metadata of the media item (e.g., image, video frame, video) that includes the visual content.

In some implementations, information on the lens used may include description of radial distortion and/or warp distortion for the lens. Description of radial distortion may include polynomial coefficients and/or terms, and/or other description of radial distortion. Description of warp distortion may include variables (e.g., X term, Y term, XY cross term), and/or other description of warp distortion.

Description of different lenses/lens types may include different types of information. For example, information on Linear and Wide lenses may include description of the corresponding radial distortion (e.g., arctangent function for Linear, classical polynomial for Wide), while information on Superview and Hyperview may include description of the corresponding radial distortion and description of the corresponding warp distortion (e.g., compressing 4:3 visual content/image sensor into 16:9 visual content/image or video for Superview; compressing 8:7 visual content/image sensor into 16:9 visual content/image or video for Hyperview).

In some implementations, the aspect ratio of the visual content may be stored as combination of integers (e.g., 4 and 3 for 4:3 aspect ratio) and/or as a float value (e.g., 1.3333). In some implementations, information on the lens may not define resolution of the visual content. The usage of the lens may be independent of visual content resolution.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
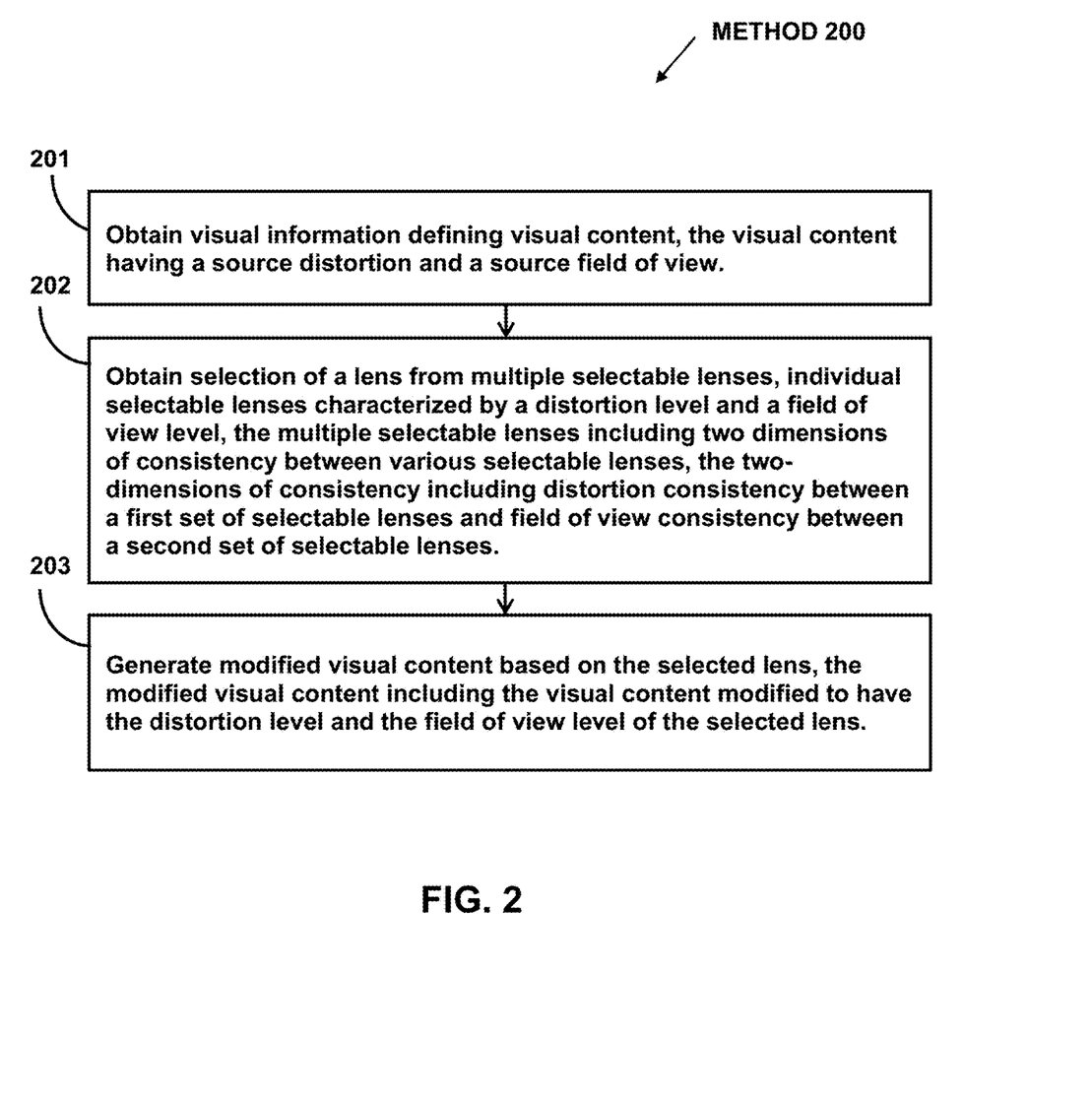
FIG. 2 illustrates an example method for simulating multiple lenses.

FIG. 2 illustrates method 200 for simulating multiple lenses. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define visual content having a source distortion and a source field of view. In some implementations, operation 201 may be performed by a processor component the same as or similar to the visual information component 102 (Shown in FIG. 1 and described herein).

At operation 202, selection of a lens from multiple selectable lenses may be obtained. Individual selectable lenses may be characterized by a distortion level and a field of view level. The multiple selectable lenses may include two dimensions of consistency between various selectable lenses. The two-dimensions of consistency may include distortion consistency between a first set of selectable lenses and field of view consistency between a second set of selectable lenses. The distortion consistency between the first set of selectable lenses may include the first set of selectable lenses being characterized by a single distortion level. The field of view consistency between the second set of selectable lenses may include the second set of selectable lenses being characterized by a single field of view level. In some implementations, operation 202 may be performed by a processor component the same as or similar to the lens selection component 104 (Shown in FIG. 1 and described herein).

At operation 203, modified visual content may be generated based on the selected lens and/or other information. The modified visual content may include the visual content modified to have the distortion level and the field of view level of the selected lens. In some implementations, operation 203 may be performed by a processor component the same as or similar to the modification component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating multiple lenses, the system comprising:
    one or more physical processors configured by machine-readable instructions to:
        obtain visual information defining visual content, the visual content having a source distortion and a source field of view;
        obtain selection of a lens from multiple selectable lenses, the multiple selectable lenses for the visual content identified based on the source field of view of the visual content, individual selectable lenses characterized by a distortion level and a field of view level, the multiple selectable lenses including two dimensions of consistency between various selectable lenses, the two-dimensions of consistency including distortion consistency between a first set of selectable lenses and field of view consistency between a second set of selectable lenses, the distortion consistency between the first set of selectable lenses including the first set of selectable lenses being characterized by a single distortion level and the field of view consistency between the second set of selectable lenses including the second set of selectable lenses being characterized by a single field of view level, and
        generate modified visual content based on the selected lens, the modified visual content including the visual content modified to have the distortion level and the field of view level of the selected lens.

2. The system of claim 1, wherein:
    the multiple selectable lenses include a first lens and a second lens, the first lens and the second lens having the field of view consistency and not having the distortion consistency, the field of view consistency and non-distortion consistency between the first lens and the second lens resulting in the first lens and the second lens providing same field of view of the visual content while using different aspect ratios;

the first lens provides a 16:9 aspect ratio view of the visual content, the 16:9 aspect ratio view of the visual content maintaining shape of one or more things depicted within a center column of the visual content;

the second lens provides an 8:7 aspect ratio view of the visual content, the 8:7 aspect ratio view of the visual content including a radially symmetric distortion; and distortion of the visual content is greater in the 16:9 aspect ratio view of the visual content than in the 8:7 aspect ratio view of the visual content.

3. A system for simulating multiple lenses, the system comprising:

one or more physical processors configured by machine-readable instructions to:

obtain visual information defining visual content, the visual content having a source distortion and a source field of view;

obtain selection of a lens from multiple selectable lenses, individual selectable lenses characterized by a distortion level and a field of view level, the multiple selectable lenses including two dimensions of consistency between various selectable lenses, the two-dimensions of consistency including distortion consistency between a first set of selectable lenses and field of view consistency between a second set of selectable lenses, the distortion consistency between the first set of selectable lenses including the first set of selectable lenses being characterized by a single distortion level and the field of view consistency between the second set of selectable lenses including the second set of selectable lenses being characterized by a single field of view level, and generate modified visual content based on the selected lens, the modified visual content including the visual content modified to have the distortion level and the field of view level of the selected lens.

4. The system of claim 3, wherein the multiple selectable lenses for the visual content are identified based on the source field of view of the visual content.

5. The system of claim 3, wherein the multiple selectable lenses include a first lens and a second lens, the first lens and the second lens having the field of view consistency and not having the distortion consistency, the field of view consistency and non-distortion consistency between the first lens and the second lens resulting in the first lens and the second lens providing same field of view of the visual content while using different aspect ratios.

6. The system of claim 5, wherein:

the first lens provides a 16:9 aspect ratio view of the visual content;

the second lens provides an 8:7 aspect ratio view of the visual content; and distortion of the visual content is greater in the 16:9 aspect ratio view of the visual content than in the 8:7 aspect ratio view of the visual content.

7. The system of claim 6, wherein the 16:9 aspect ratio view of the visual content maintains shape of one or more things depicted within a center column of the visual content.

8. The system of claim 6, wherein the 8:7 aspect ratio view of the visual content includes a radially symmetric distortion.

9. The system of claim 6, wherein:

the second lens has the distortion consistency with a third lens and a fourth lens; and the second lens, the third lens, and the fourth lens do not have the field of view consistency.

10. The system of claim 9, wherein:

the third lens provides a 4:3 aspect ratio view of the visual content;

the fourth lens provides a 16:9 aspect ratio view of the visual content; and distortion of the visual content is same in the 8:7 aspect ratio view of the visual content, the 4:3 aspect ratio view of the visual content, and the 16:9 aspect ratio view of the visual content.

11. The system of claim 10, wherein:

the third lens does not have the distortion consistency with a fifth lens;

the third lens and the fifth lens have the field of view consistency;

the fifth lens provides a 16:9 aspect ratio view of the visual content;

distortion of the visual content is greater in the 16:9 aspect ratio view provided by the fifth lens than in the 4:3 aspect ratio view provided by the third lens; and distortion of the visual content is less in the 16:9 aspect ratio view provided by the fifth lens than in the 16:9 aspect ratio view provided by the first lens.

12. A method for simulating multiple lenses, the method performed by a computing system including one or more processors, the method comprising:

obtaining, by the computing system, visual information defining visual content, the visual content having a source distortion and a source field of view;

obtaining, by the computing system, selection of a lens from multiple selectable lenses, individual selectable lenses characterized by a distortion level and a field of view level, the multiple selectable lenses including two dimensions of consistency between various selectable lenses, the two-dimensions of consistency including distortion consistency between a first set of selectable lenses and field of view consistency between a second set of selectable lenses, the distortion consistency between the first set of selectable lenses including the first set of selectable lenses being characterized by a single distortion level and the field of view consistency between the second set of selectable lenses including the second set of selectable lenses being characterized by a single field of view level, and generating, by the computing system, modified visual content based on the selected lens, the modified visual content including the visual content modified to have the distortion level and the field of view level of the selected lens.

13. The method of claim 12, wherein the multiple selectable lenses for the visual content are identified based on the source field of view of the visual content.

14. The method of claim 12, wherein the multiple selectable lenses include a first lens and a second lens, the first lens and the second lens having the field of view consistency and not having the distortion consistency, the field of view consistency and non-distortion consistency between the first lens and the second lens resulting in the first lens and the second lens providing same field of view of the visual content while using different aspect ratios.

15. The method of claim 14, wherein:

the first lens provides a 16:9 aspect ratio view of the visual content;

the second lens provides an 8:7 aspect ratio view of the visual content; and distortion of the visual content is greater in the 16:9 aspect ratio view of the visual content than in the 8:7 aspect ratio view of the visual content.

16. The method of claim 15, wherein the 16:9 aspect ratio view of the visual content maintains shape of one or more things depicted within a center column of the visual content.

17. The method of claim 15, wherein the 8:7 aspect ratio view of the visual content includes a radially symmetric distortion.

18. The method of claim 15, wherein:
the second lens has the distortion consistency with a third lens and a fourth lens; and
the second lens, the third lens, and the fourth lens do not have the field of view consistency.

19. The method of claim 18, wherein:
the third lens provides a 4:3 aspect ratio view of the visual content;
the fourth lens provides a 16:9 aspect ratio view of the visual content; and
distortion of the visual content is same in the 8:7 aspect ratio view of the visual content, the 4:3 aspect ratio view of the visual content, and the 16:9 aspect ratio view of the visual content.

20. The method of claim 19, wherein:
the third lens does not have the distortion consistency with a fifth lens;
the third lens and the fifth lens have the field of view consistency;
the fifth lens provides a 16:9 aspect ratio view of the visual content;
distortion of the visual content is greater in the 16:9 aspect ratio view provided by the fifth lens than in the 4:3 aspect ratio view provided by the third lens; and
distortion of the visual content is less in the 16:9 aspect ratio view provided by the fifth lens than in the 16:9 aspect ratio view provided by the first lens.

* * * * *